(12) United States Patent
Ward et al.

(10) Patent No.: US 12,682,761 B2
(45) Date of Patent: Jul. 14, 2026

(54) TECHNOLOGIES FOR OPTIMAL VEHICLE PLATOONING CONTROL OVER STEEP TERRAIN

(71) Applicant: AUBURN UNIVERSITY, Auburn, AL (US)

(72) Inventors: Jacob Ward, Auburn, AL (US); Evan Stegner, Auburn, AL (US); Mark A. Hoffman, Auburn, AL (US); David M. Bevly, Auburn, AL (US)

(73) Assignee: AUBURN UNIVERSITY, Auburn, AL (US)

( * ) Notice: Subject to any disclaimer, the term of this patent is extended or adjusted under 35 U.S.C. 154(b) by 335 days.

(21) Appl. No.: 18/137,761

(22) Filed: Apr. 21, 2023

(65) Prior Publication Data

US 2023/0343221 A1      Oct. 26, 2023

Related U.S. Application Data

(60) Provisional application No. 63/333,717, filed on Apr. 22, 2022.

(51) Int. Cl.
| | |
|---|---|
| *G08G 1/00* | (2006.01) |
| *B60W 30/14* | (2006.01) |
| *B60W 40/12* | (2012.01) |

(52) U.S. Cl.
CPC ............. *G08G 1/22* (2013.01); *B60W 30/143* (2013.01); *B60W 40/12* (2013.01); *B60W 2520/28* (2013.01); *B60W 2554/80* (2020.02)

(58) Field of Classification Search
CPC ...... G08G 1/22; B60W 30/143; B60W 40/12; B60W 2520/28; B60W 2554/80
See application file for complete search history.

(56) References Cited

U.S. PATENT DOCUMENTS

| | | | | |
|---|---|---|---|---|
| 2016/0297435 A1* | 10/2016 | D'Amato | ............ | B60W 30/143 |
| 2019/0171228 A1* | 6/2019 | Switkes | ............... | G05D 1/0295 |
| 2020/0156639 A1* | 5/2020 | Liu | ...................... | B60W 30/182 |
| 2021/0024086 A1* | 1/2021 | Jin | ......................... | B60W 30/02 |
| 2021/0116935 A1* | 4/2021 | Kalabic | ................... | G08G 1/22 |
| 2021/0213948 A1* | 7/2021 | Lahti | ................... | B60W 30/162 |
| 2021/0291862 A1* | 9/2021 | Jiang | ................ | B60W 60/0017 |
| 2021/0323578 A1* | 10/2021 | Wang | ...................... | G06F 17/18 |

FOREIGN PATENT DOCUMENTS

WO      WO-2019094538 A1 *   5/2019

* cited by examiner

*Primary Examiner* — Erin M Piateski
*Assistant Examiner* — Caitlin R Mccleary
(74) *Attorney, Agent, or Firm* — Barnes & Thornburg LLP

(57) ABSTRACT

Technologies for platooned include a leader vehicle and one or more follower vehicles each including a computing device. The leader vehicle computing device controls velocity of the leader vehicle within a predetermined route based on a grade profile of the predetermined route. The leader vehicle may perform nonlinear model predictive control using a cost function based on predicted velocity error and predicted fuel consumption. The follower vehicle computing device controls velocity of the follower vehicle within the predetermined route based on headway distance to the leader vehicle and the grade profile. The follower vehicle may perform nonlinear model predictive control using a cost function based on predicted headway error, predicted headway rate of change, and predicted fuel consumption. Other embodiments are described and claimed.

15 Claims, 6 Drawing Sheets

600

700

TECHNOLOGIES FOR OPTIMAL VEHICLE PLATOONING CONTROL OVER STEEP TERRAIN

CROSS-REFERENCE TO RELATED APPLICATIONS

The present application claims priority under 35 U.S.C. § 119(e) to U.S. Provisional Application Ser. No. 63/333,717, filed Apr. 22, 2022, the entire disclosure of which is hereby incorporated by reference.

STATEMENT REGARDING FEDERALLY SPONSORED RESEARCH

This invention was made with Government support under Federal Grant No. DE-EE0008470, awarded by the Department of Energy. The Government has certain rights in this invention.

BACKGROUND

Fuel is one of the largest operating costs for class 8 trucks such as semi-trailer trucks. Platooning multiple vehicles—that is, running multiple vehicles together with relatively small headway gaps between the vehicles—reduces fuel consumption by reducing aerodynamic drag. For safety concerns, platooning vehicles may use active control to maintain a constant following distance. Platooning vehicles with constant following distance on level terrain may significantly improve fuel economy for the leading vehicle as well as following vehicles.

However, class 8 trucks and other large vehicles may not be able to maintain a constant speed over hills and other challenging terrain. For example, a hill may be considered steep if a vehicle cannot maintain a constant speed on ascending grade due to vehicle power limitations. Similarly, a hill may be considered steep if the vehicle must apply brakes on descending grade. Due to excessive braking and/or other active deceleration, platooning vehicles with constant following distance over steep terrain may not result in improvement to fuel economy for following vehicles.

SUMMARY

According to one aspect, a method for platooned vehicle control includes controlling, by a first computing device of a leader vehicle, velocity of the leader vehicle within a predetermined route based on a grade profile of the predetermined route; and controlling, by a second computing device of a follower vehicle, velocity of the follower vehicle within the predetermined route based on a headway distance between the follower vehicle and the leader vehicle and the grade profile of the predetermined route. In some embodiments, the method further includes communicating, by the first computing device, vehicle state data for the leader vehicle to the follower vehicle; wherein controlling the velocity of the follower vehicle further comprises controlling the velocity of the follower vehicle based on the vehicle state data for the leader vehicle.

In some embodiments, controlling the velocity of the following vehicle comprises determining a torque trajectory and a velocity trajectory using nonlinear model predictive control with a cost function based on predicted headway error, predicted headway rate of change, and predicted fuel consumption. In some embodiments, evaluating the cost function comprises determining wheel speed of the follower vehicle using a nonlinear longitudinal vehicle model; determining engine speed based on the wheel speed; determining engine torque based on the engine speed and a torque curve associated with the follower vehicle; and determining the predicted fuel consumption based on the engine torque and the engine speed. In some embodiments, determining the torque trajectory and the velocity trajectory further comprises simulating headway, leader velocity, and follower velocity using a nonlinear longitudinal vehicle model with the grade profile of the predetermined route; evaluating the cost function based on simulating the headway, the leader velocity, and the follower velocity; and determining the torque trajectory and the velocity trajectory by minimizing the cost function.

In some embodiments, simulating the headway, the leader velocity, and the follower velocity further comprises calculating a derivative of the headway comprising a change in headway, calculating a derivative of the leader velocity comprising a damped leader acceleration, and calculating a derivative of the follower velocity comprising a follower acceleration. In some embodiments, simulating the headway, the leader velocity, and the follower velocity further comprises receiving leader velocity data from the leader vehicle via a vehicle-to-vehicle communication link. In some embodiments, calculating the derivative of the headway comprising the change in headway comprises calculating a difference between the leader velocity data and follower velocity data. In some embodiments, simulating the headway, the leader velocity, and the follower velocity further comprises receiving leader acceleration data from the leader vehicle via a vehicle-to-vehicle communication link. In some embodiments, calculating the derivative of the leader velocity comprising the damped leader acceleration comprises applying a first order decay to the acceleration data.

In some embodiments, controlling the velocity of the follower vehicle comprises determining a torque trajectory and a velocity trajectory using a string-stable controller.

In some embodiments, controlling the velocity of the leader vehicle comprises determining a torque trajectory and a velocity trajectory using nonlinear model predictive control with a cost function based on predicted velocity error and predicted fuel consumption. In some embodiments, determining the torque trajectory and the velocity trajectory further comprises simulating vehicle position and vehicle velocity using a nonlinear longitudinal vehicle model with the grade profile of the predetermined route; evaluating the cost function based on simulating the vehicle position and the vehicle velocity; and determining the torque trajectory and the velocity trajectory by minimizing the cost function. In some embodiments, simulating the vehicle position and the vehicle velocity further comprises calculating a derivative of the vehicle position comprising the vehicle velocity, and calculating a derivative of the vehicle velocity comprising a vehicle acceleration.

According to another aspect, a system for platooned vehicle control includes a first computing device coupled to a leader vehicle and a second computing device coupled to a follower vehicle. The first computing device comprises a lookahead cruise controller to control velocity of the leader vehicle within a predetermined route based on a grade profile of the predetermined route. The second computing device comprises a headway controller to control velocity of the follower vehicle within the predetermined route based on a headway distance between the follower vehicle and the leader vehicle and the grade profile of the predetermined route. In some embodiments, the lookahead cruise controller of the leader vehicle is further to communicate vehicle state data for the leader vehicle to the follower vehicle; and to control the velocity of the follower vehicle further comprises to control the velocity of the follower vehicle based on the vehicle state data for the leader vehicle.

In some embodiments, to control the velocity of the following vehicle comprises to determine a torque trajectory and a velocity trajectory using a nonlinear model predictive control with a cost function based on predicted headway error, predicted headway rate of change, and predicted fuel consumption. In some embodiments, to evaluate the cost function comprises to determine wheel speed of the follower vehicle with a nonlinear longitudinal vehicle model; determine engine speed based on the wheel speed; determine engine torque based on the engine speed and a torque curve associated with the follower vehicle; and determine the predicted fuel consumption based on the engine torque and the engine speed. In some embodiments, to determine the torque trajectory and the velocity trajectory further comprises to simulate headway, leader velocity, and follower velocity with a nonlinear longitudinal vehicle model with the grade profile of the predetermined route; evaluate the cost function based on simulating the headway, the leader velocity, and the follower velocity; and determine the torque trajectory and the velocity trajectory by minimization of the cost function.

In some embodiments, to simulate the headway, the leader velocity, and the follower velocity further comprises to calculate a derivative of the headway comprising a change in headway, to calculate a derivative of the leader velocity comprising a damped leader acceleration, and to calculate a derivative of the follower velocity comprising a follower acceleration. In some embodiments, to simulate the headway, the leader velocity, and the follower velocity further comprises to receive leader velocity data from the leader vehicle via a vehicle-to-vehicle communication link. In some embodiments, to calculate the derivative of the headway comprising the change in headway comprises to calculate a difference between the leader velocity data and follower velocity data. In some embodiments, to simulate the headway, the leader velocity, and the follower velocity further comprises to receive leader acceleration data from the leader vehicle via a vehicle-to-vehicle communication link. In some embodiments, to calculate the derivative of the leader velocity comprising the damped leader acceleration comprises to apply a first order decay to the acceleration data.

In some embodiments, to control the velocity of the follower vehicle comprises to determine a torque trajectory and a velocity trajectory using a string-stable controller.

In some embodiments, to control the velocity of the leader vehicle comprises to determine a torque trajectory and a velocity trajectory using nonlinear model predictive control with a cost function based on predicted velocity error and predicted fuel consumption. In some embodiments, to determine the torque trajectory and the velocity trajectory further comprises to simulate vehicle position and vehicle velocity using a nonlinear longitudinal vehicle model with the grade profile of the predetermined route; evaluate the cost function based on simulating the vehicle position and the vehicle velocity; and determine the torque trajectory and the velocity trajectory by minimizing the cost function. In some embodiments, to simulate the vehicle position and the vehicle velocity further comprises to calculate a derivative of the vehicle position comprising the vehicle velocity, and to calculate a derivative of the vehicle velocity comprising a vehicle acceleration.

According to another aspect, a computing device for platooned vehicle control comprises a lookahead headway controller and a nonlinear model predictive controller. The lookahead headway controller is to control velocity of a follower vehicle within a predetermined route based on a headway distance between the follower vehicle and a leader vehicle and a grade profile of the predetermined route. The nonlinear model predictive controller is to determine a torque trajectory and a velocity trajectory for the lookahead headway controller using a cost function based on predicted headway error, predicted headway rate of change, and predicted fuel consumption. In some embodiments, the headway controller is further to receive vehicle state data for the leader vehicle from the leader vehicle; and to control the velocity of the follower vehicle further comprises to control the velocity of the follower vehicle based on the vehicle state data for the leader vehicle.

In some embodiments, to evaluate the cost function comprises to determine wheel speed of the follower vehicle with a nonlinear longitudinal vehicle model; determine engine speed based on the wheel speed; determine engine torque based on the engine speed and a torque curve associated with the follower vehicle; and determine the predicted fuel consumption based on the engine torque and the engine speed. In some embodiments, to determine the torque trajectory and the velocity trajectory further comprises to simulate headway, leader velocity, and follower velocity with a nonlinear longitudinal vehicle model with the grade profile of the predetermined route; evaluate the cost function based on simulating the headway, the leader velocity, and the follower velocity; and determine the torque trajectory by minimization of the cost function.

In some embodiments, to simulate the headway, the leader velocity, and the follower velocity further comprises to calculate a derivative of the headway comprising a change in headway, to calculate a derivative of the leader velocity comprising a damped leader acceleration, and to calculate a derivative of the follower velocity comprising a follower acceleration. In some embodiments, to simulate the headway, the leader velocity, and the follower velocity further comprises to receive leader velocity data from the leader vehicle via a vehicle-to-vehicle communication link. In some embodiments, to calculate the derivative of the headway comprising the change in headway comprises to calculate a difference between the leader velocity data and follower velocity data. In some embodiments, to simulate the headway, the leader velocity, and the follower velocity further comprises to receive leader acceleration data from the leader vehicle via a vehicle-to-vehicle communication link. In some embodiments, to calculate the derivative of the leader velocity comprising the damped leader acceleration comprises to apply a first order decay to the acceleration data.

In some embodiments, to control the velocity of the follower vehicle comprises to determine a torque trajectory and a velocity trajectory using a string-stable controller.

According to another aspect, a computing device for platooned vehicle control includes a lookahead cruise controller and a nonlinear model predictive controller. The lookahead cruise controller is to control velocity of the leader vehicle within a predetermined route based on a grade profile of the predetermined route. The nonlinear model predictive controller is to determine a torque trajectory and a velocity trajectory for the lookahead cruise controller using nonlinear model predictive control with a cost function based on predicted velocity error and predicted fuel consumption. In some embodiments, the lookahead cruise controller of the leader vehicle is further to communicate vehicle state data for the leader vehicle to the follower vehicle; and to control the velocity of the follower vehicle further comprises to control the velocity of the follower vehicle based on the vehicle state data for the leader vehicle.

In some embodiments, to determine the torque trajectory and the velocity trajectory further comprises to simulate vehicle position and vehicle velocity using a nonlinear longitudinal vehicle model with the grade profile of the predetermined route; evaluate the cost function based on simulating the vehicle position and the vehicle velocity; and determine the torque trajectory and the velocity trajectory by minimizing the cost function. In some embodiments, to simulate the vehicle position and the vehicle velocity further comprises to calculate a derivative of the vehicle position comprising the vehicle velocity, and to calculate a derivative of the vehicle velocity comprising a vehicle acceleration.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
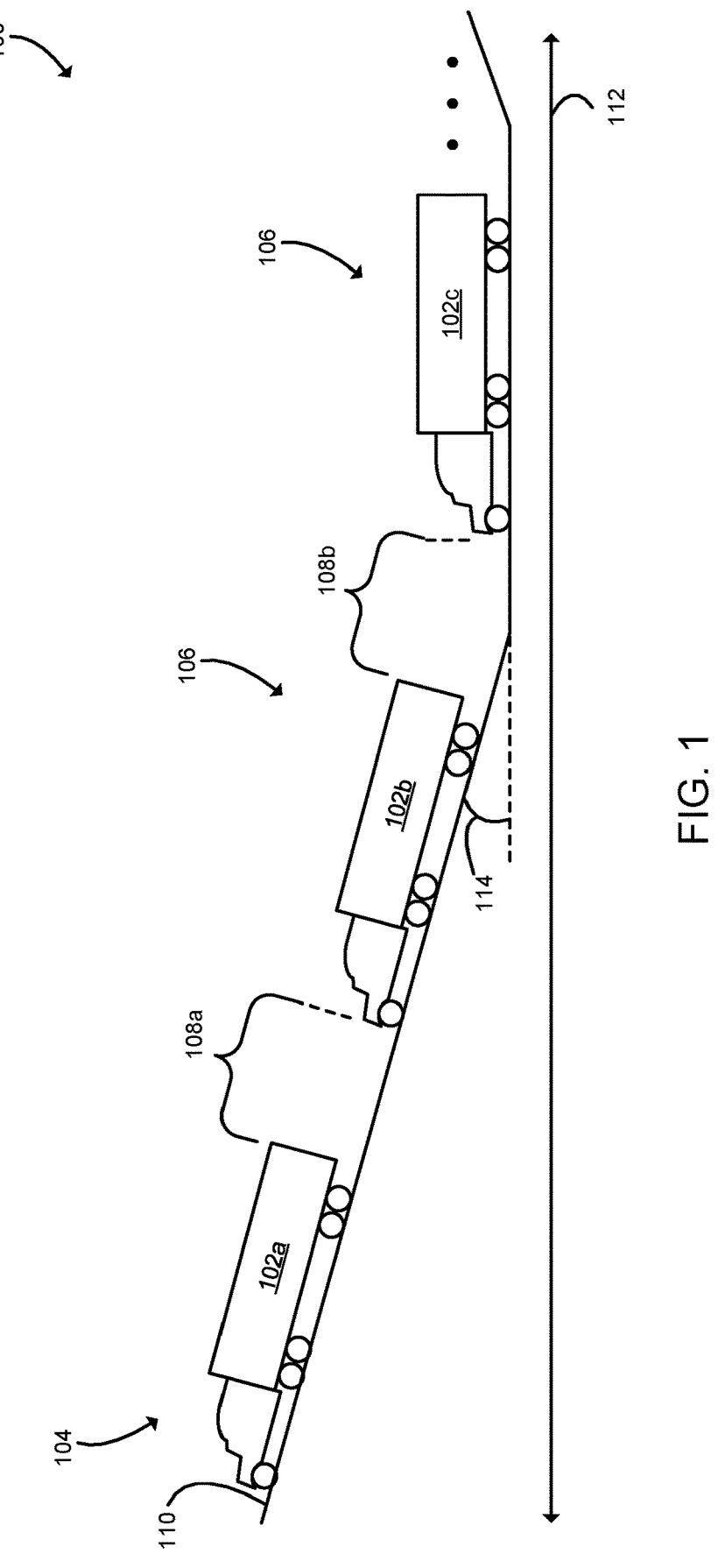
FIG. 1 is a simplified block diagram of at least one embodiment of a system for optimal vehicle platooning control over steep terrain.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for optimal vehicle platooning control over steep terrain includes multiple vehicles 102, which are illustratively class 8 heavy trucks 102a, 102b, 102c. As shown, the trucks 102 are arranged in a platooning formation, and the truck 102a is designated as a leader vehicle 104, and the trucks 102b, 102c are designated as follower vehicles 102b, 102c. Of course, it should be understood that in some embodiments the number, ordering, and/or arrangement of the trucks 102 may be varied.

As shown, each of the trucks 102 is separated by a headway 108, which is a distance between consecutive vehicles 102 and may be measured in length units (e.g., feet, meters, etc.) or time units for a given velocity (e.g., 1.0 sec following distance, 0.7 sec following distance, etc.). For example, headway 108a is established between the trucks 102a, 102b, and headway 108b is established between trucks 102b, 102c. In the illustrative embodiment, the trucks 102 are traveling on a route 110, which may be along a highway or other predetermined route. The route may be characterized by positions 112, which may be embodied as one-dimensional or two-dimensional coordinates or other locations, and corresponding grades 114. As described further below, the system 100 controls speed of the vehicles 102 based on a predetermined map of the grade 114 over the route 110. The system 100 allows the speed of the vehicles 102 as well as the headway 108 between the vehicles to vary in order to optimize fuel efficiency.

Figure 8:
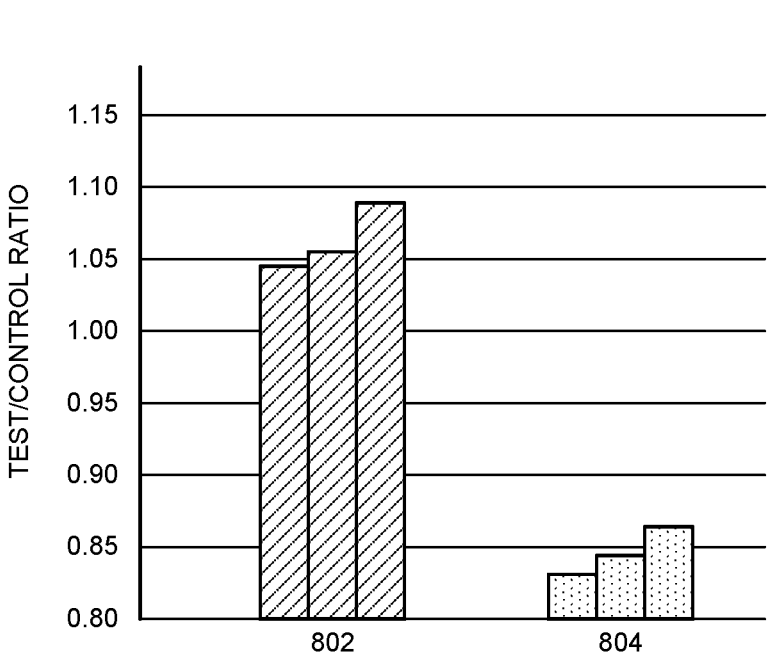
FIG. 8 is a chart illustrating sample experimental results that may be achieved by the system of FIGS. 1-3.

Referring now to FIG. 8, chart 800 illustrates experimental results that may be achieved by the system 100. In particular, multiple test runs were performed for an example system 100 including a single leader vehicle 104 and a single follower vehicle 106. A single vehicle without any platooning was measured as control. Vehicle fuel consumption was measured over a predetermined route 110 that included multiple steep hills. Fuel efficiency values are shown in the chart 800 as a ratio of the test vehicle fuel consumption divided by the control vehicle fuel consumption, meaning that lower values are more fuel-efficient. Series 802 shows test results for a follower vehicle using a fixed following distance PID controller following a lead vehicle using cruise control. Series 804 shows test results for a follower vehicle 104 using an optimal following control as described herein following a leader vehicle 104 using nonlinear model predictive control (NMPC) as described herein. As shown, treating the series 804 as the test set and the series 802 as baseline, optimal following as described herein has fuel savings of 20.4±4.3% compared to baseline, which is statistically significant. Similar tests over terrain that was not steep (e.g., did not include any steep grades) did not show any significant difference between optimal following and fixed following. Accordingly, the control systems described herein may provide for improved fuel consumption for platooning vehicles 102 both compared to vehicles traveling alone and compared to platooning vehicles with typical fixed following distances.

Figure 2:
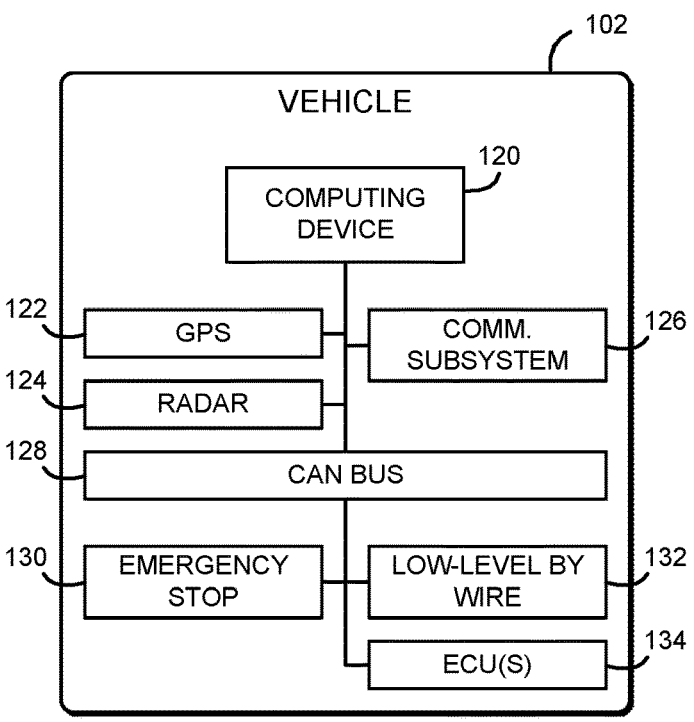
FIG. 2 is a simplified block diagram of a vehicle of the system of FIG. 1.

Referring now to FIG. 2, components of an illustrative vehicle 102 are shown. The vehicle 102 may be embodied as a semi-truck, a tractor, a class 8 truck, or other vehicle. As shown in FIG. 1, the vehicle 102 includes a computing device 120, a GPS system 122, a radar system 124, and a communication subsystem 126. The computing device 120 may be embodied as a computer, an embedded computer, an industrial computer a mobile device, a microprocessor, a microcontroller, and/or other control circuitry. For example, the computing device 120 may be embodied as a ruggedized industrial computer for vehicular or embedded use. Accordingly, the computing device 120 may include a processor, an I/O subsystem, memory, a data storage device, and/or other components commonly found in an industrial computer. In operation, the computing device 120 may store various data and software used during operation of the vehicle 102 such as operating systems, applications, programs, libraries, and drivers.

The GPS system 122 may be embodied as a global positioning system (GPS) receiver, a Galileo receiver, a GLONASS receiver, a global navigation satellite system (GNSS) receiver, or other location circuitry capable of determining the precise coordinates of the vehicle 102. The radar system 124 may be embodied as a forward-facing radar capable of determining the distance between the vehicle 102 and a preceding vehicle (e.g., a leader 104 or preceding follower vehicle 106). In other embodiments, the vehicle 102 may include a lidar system or similar rangefinding device. The communication subsystem 126 may be embodied as a short-range wireless communication system enabling vehicle-to-vehicle communications between the vehicle 102 and other vehicles 102 in the system 100. For example, the communication subsystem 126 may include one or more dedicated short range communication (DSRC) radios operating at 5.9 GHz. The GPS system 122, the radar system 124, and the communications subsystem 126 are coupled to the computing device 120, which processes data generated by those devices. For example, the computing device 120 may communicate data via Ethernet with a DSRC radio, which may exchange the data wirelessly with DSRC radios of other vehicles 102.

The computing device 120 is also coupled to a controller area network (CAN) bus 128, which is a vehicle bus for communication between components of the vehicle 102, and is illustratively a J1939 bus for communication among components of a heavy vehicle. In some embodiments, the computing device 120 may communicate with devices connected to the CAN bus 128 via a CAN gateway or other communication devices. As shown, the CAN bus 128 may be coupled to multiple components including an emergency stop control 130, low-level by wire system 132, and one or more electronic control unit(s) (ECU(s)) 134. The low-level by wire system 132 may allow for computerized control of one or more components of the vehicle 102, including engine torque (e.g., acceleration), braking, and in some embodiments, steering. The emergency stop control 130 may allow a driver or other user to terminate automatic control of the vehicle 102 if unsafe conditions occur. The ECUs 134 may include engine controllers, throttle controllers, transmission controllers, braking controllers, steering controllers, and/or other control devices of the vehicle 102.

As discussed in more detail below, the vehicles 102 may be configured to transmit and receive data with each other and/or other devices of the system 100 over one or more direct wireless links or, in some embodiments, a network. The network may be embodied as any number of various wired and/or wireless networks. For example, the network may be embodied as, or otherwise include, a cellular network (e.g., a 3G LTE, 4G, or 5G network), a wired or wireless wide area network (WAN), a wired or wireless local area network (LAN), and/or a publicly-accessible, global network such as the Internet. As such, the network may include any number of additional devices, such as additional computers, routers, and switches, to facilitate communications among the vehicles 102 of the system 100.

Figure 3:
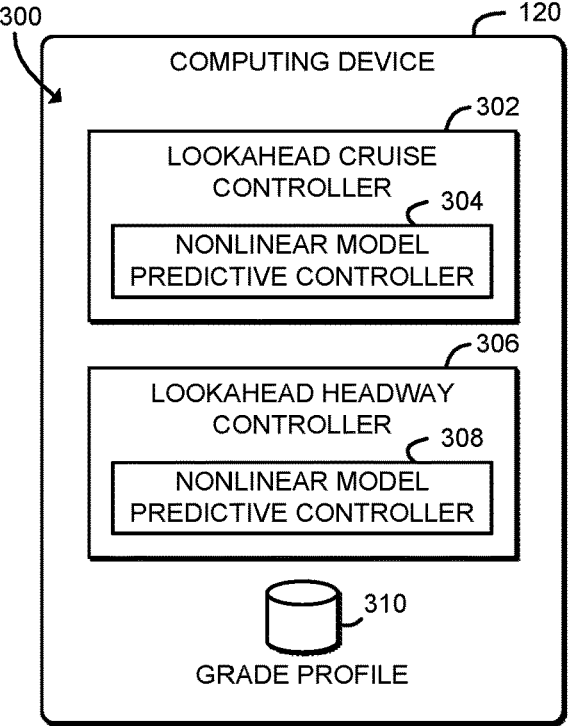
FIG. 3 is a simplified block diagram of various environments that may be established by a computing device of a vehicle of FIGS. 1 and 2.

Referring now to FIG. 3, in the illustrative embodiment, a vehicle 102 establishes an environment 300 during operation. The illustrative environment 300 includes a lookahead cruise controller 302 and a lookahead headway controller 306. The various components of the environment 300 may be embodied as hardware, firmware, software, or a combination thereof. As such, in some embodiments, one or more of the components of the environment 300 may be embodied as circuitry or a collection of electrical devices (e.g., lookahead cruise controller circuitry 302 and/or lookahead headway controller circuitry 306). It should be appreciated that, in such embodiments, one or more of those components may form a portion of the computing device 120 and/or other components of the vehicle 102.

The lookahead cruise controller 302 is configured to control velocity of the leader vehicle 104 within a predetermined route 110 based on a grade profile of the predetermined route 110. The grade profile may be embodied as grade profile data 310 stored by or otherwise accessible by the computing device 102. The lookahead cruise controller 302 may be further configured to communicate vehicle state data for the leader vehicle 104 to a follower vehicle 106. Controlling velocity of the leader vehicle 104 may include determining a torque trajectory and a velocity trajectory using nonlinear model predictive control with a cost function based on predicted velocity error and predicted fuel consumption. Determining the torque trajectory and the velocity trajectory may further include simulating vehicle position and vehicle velocity using a nonlinear longitudinal vehicle model with the grade profile 310, evaluating the cost function based on simulating the vehicle position and the vehicle velocity, and determining the torque trajectory by minimizing the cost function. Simulating the vehicle position and the vehicle velocity may further include calculating a derivative of the vehicle position comprising the vehicle velocity, and calculating a derivative of the vehicle velocity comprising a vehicle acceleration. In some embodiments, one or more of those functions may be performed by one or more sub-components, such as a nonlinear model predictive controller 304.

The lookahead headway controller 306 is configured to control velocity of the follower vehicle 106 within the predetermined route 110 based on a headway distance 108 between the follower vehicle 106 and the leader vehicle 104 and the grade profile 310 of the predetermined route 110. Controlling the velocity of the following vehicle 106 may include determining a torque trajectory and a velocity trajectory using a nonlinear model predictive control with a cost function based on predicted headway error, predicted headway rate of change, and predicted fuel consumption. Evaluating the cost function may include determining wheel speed of the follower vehicle 106 with a nonlinear longitudinal vehicle model; determining engine speed based on the wheel speed, determining engine torque based on the engine speed and a torque curve associated with the follower vehicle 106, and determining the predicted fuel consumption based on the engine torque and the engine speed. Determining the torque trajectory and the velocity trajectory may further include simulating headway, leader velocity, and follower velocity with a nonlinear longitudinal vehicle model with the grade profile 310 of the predetermined route, evaluating the cost function based on the simulated headway, leader velocity, and follower velocity, and determining the torque trajectory by minimizing the cost function. Simulating the headway, the leader velocity, and the follower velocity may further include calculating a derivative of the headway comprising a change in headway, calculating a derivative of the leader velocity comprising a damped leader acceleration, and calculating a derivative of the follower velocity comprising a follower acceleration. Simulating the headway, the leader velocity, and the follower velocity may further include receiving leader velocity data and/or leader acceleration data from the leader vehicle via a vehicle-to-vehicle communication link. Calculating the derivative of the headway may include calculating a difference between the leader velocity data and follower velocity data. Calculating the derivative of the leader velocity may include applying a first order decay to the acceleration data. In some embodiments, controlling the velocity of the follower 106 vehicle may include determining a torque trajectory and a velocity trajectory using a string-stable controller. In some embodiments, one or more of those functions may be performed by one or more sub-components, such as a nonlinear model predictive controller 308.

Figure 4:
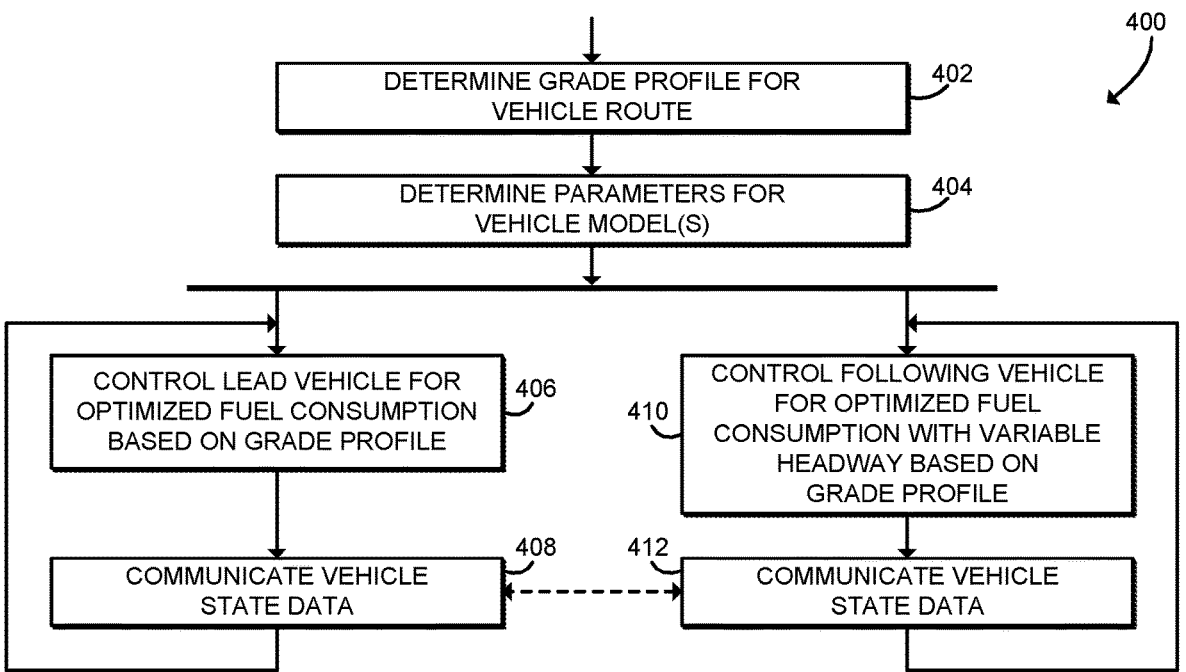
FIG. 4 is a simplified flow diagram of at least one embodiment of a method for optimal vehicle platooning control that may be executed by vehicles of FIGS. 1-3.

Referring now to FIG. 4, in use, each vehicle 102 of the system 100 may execute a method 400 for optimal vehicle platooning control. It should be appreciated that, in some embodiments, the operations of the method 400 may be performed by one or more components of the environment 300 of the vehicle 102 as shown in FIG. 3. The method 400 begins with block 402, in which the vehicle 102 determines a grade profile for a predetermined route 110. The grade profile includes data indicative of the grade 114 (e.g., angle or other measure of steepness) of the route 110 at each position 112 along the route 110. The grade profile may be determined, for example, using predetermined mapping data, recorded grade information, or other predetermined data. The grade profile may be determined by the vehicle 102 and/or provided to the vehicle 102 by another device such as another vehicle 102 or another connected or remote computing device.

In block 404, the vehicle 102 determines any parameters required for one or more vehicle models associated with the vehicle 102. For example, the vehicle 102 may determine mass, gear ratios, engine power, engine torque curves, fuel consumption models, or other vehicle-specific data. In some embodiments, the vehicle parameters may be predetermined and stored ahead of time for the vehicle 102. In some embodiments, the vehicle parameters may be updated based on sensor data or otherwise updated before each trip. For example, effective mass of the vehicle 102 including mass of any trailers or other cargo may be determined for each trip.

After determining parameters of the route 110 and each vehicle 102, the method 400 as executed by the leader vehicle 104 proceeds to block 406, and the method 400 as executed by each follower vehicle 106 proceeds to block 410. The method 400 continues in parallel, with each vehicle 102 controlling its velocity over the route 110 as described further below.

Figure 5:
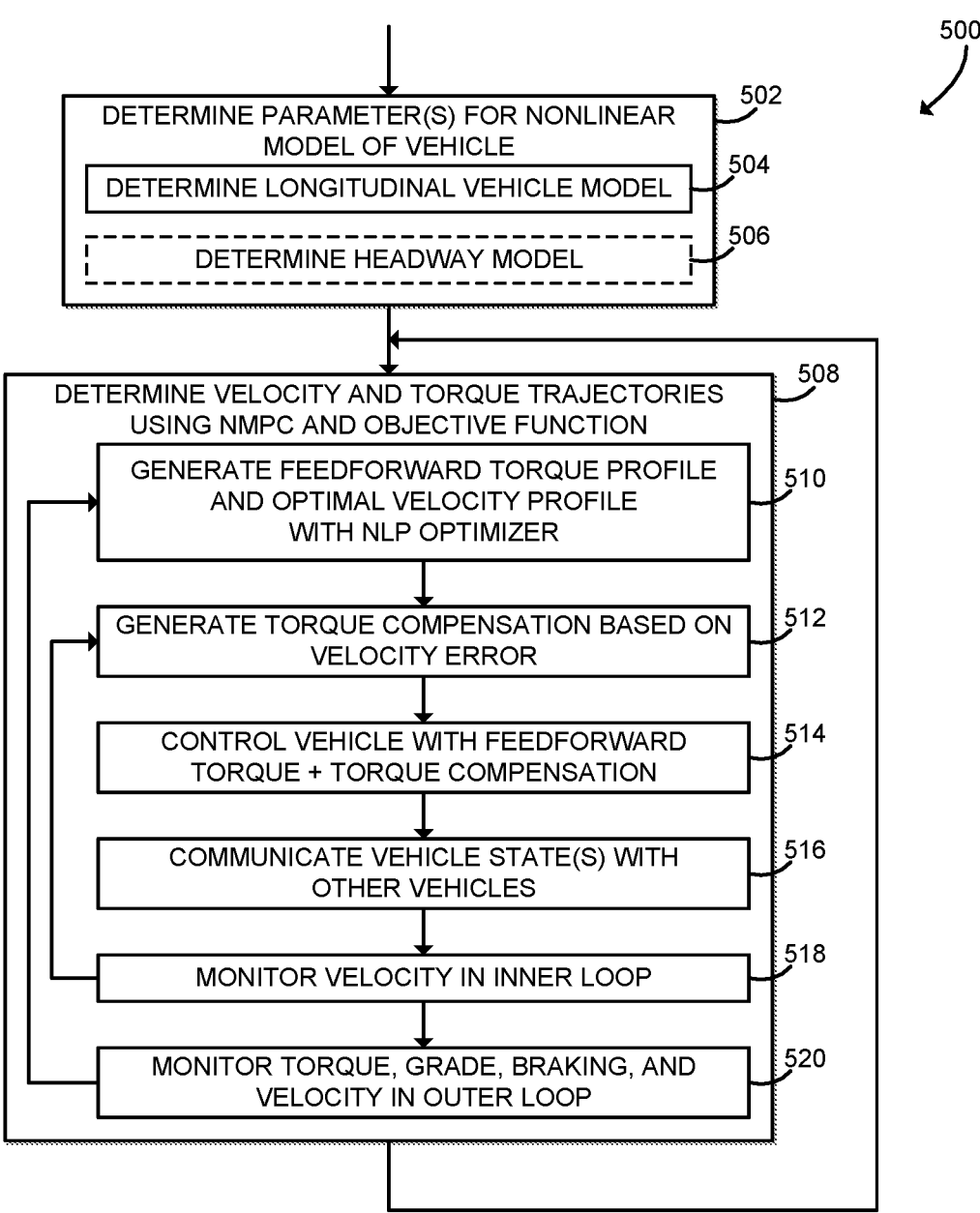
FIG. 5 is a simplified flow diagram of at least one embodiment of a method for nonlinear model predictive control that may be executed by the vehicles of FIGS. 1-4.
Figure 6:
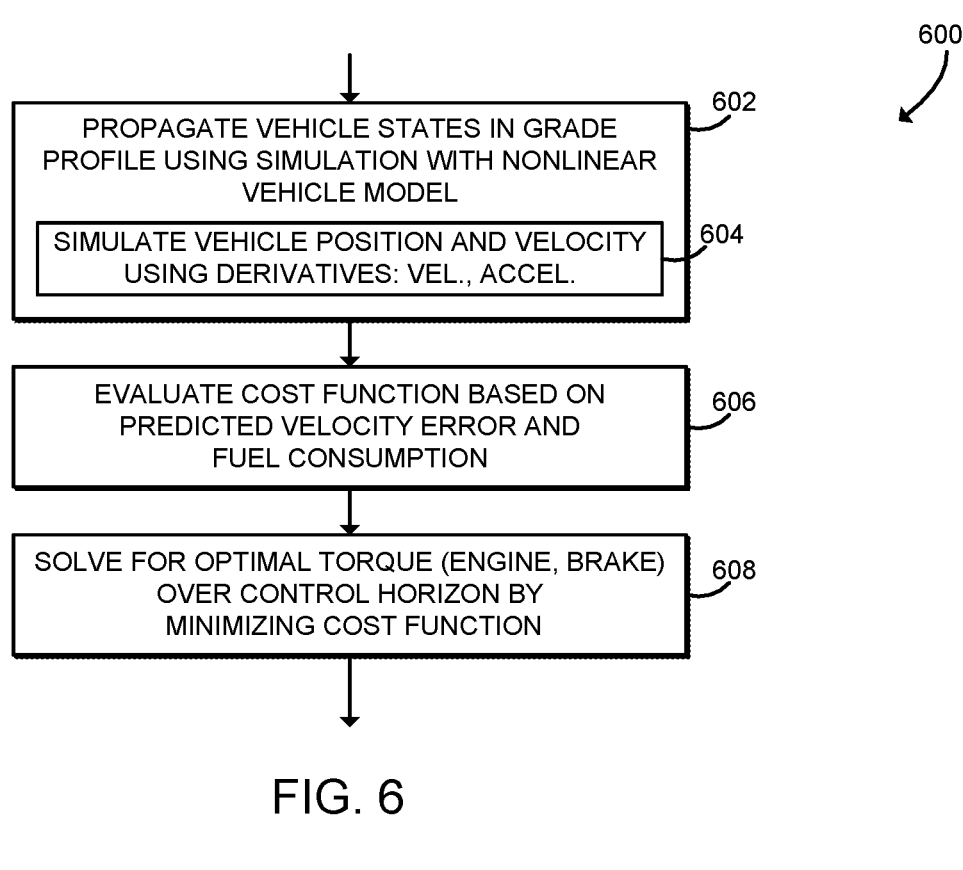
FIG. 6 is a simplified flow diagram of at least one embodiment of a method for nonlinear programming optimization that may be executed by a leader vehicle in connection with the method of FIG. 5.

In block 406, the leader vehicle 104 is controlled for optimized fuel consumption based on the grade profile. The computing device 120 of the lead vehicle 104 may, for example, control an input such as torque and/or velocity while using the grade profile to optimize fuel consumption. For example, with knowledge of an upcoming steep ascent, the computing device 120 may increase speed, which may allow the vehicle 102 to ascend the hill without dropping below a minimum speed and without requiring gear shifting. As another example, with knowledge of an upcoming steep descent, the computing device 120 may decrease speed, which may allow the vehicle 102 to descend without exceeding a maximum speed and without requiring braking. The computing device 120 may use any appropriate control techniques to optimize fuel consumption. In at least one embodiment, the computing device 120 uses nonlinear model predictive control (NMPC) to optimize fuel consumption. One potential embodiment of a method for NMPC control for the leader vehicle 104 is shown in FIGS. 5 and 6 and described further below. Additionally or alternatively, in other embodiments the computing device 120 may use other control techniques, such as linear model predictive control, predictive cruise control, or other control system.

In block 408, the leader vehicle 104 may communicate vehicle state with other vehicles 102 of the system 100. The leader vehicle 104 may, for example, communicate data indicative of velocity, acceleration, or other vehicle state data with one or more follower vehicles 106. After communicating vehicle state data, the method 400 loops back to block 406 to continue controlling the leader vehicle 104.

Figure 7:
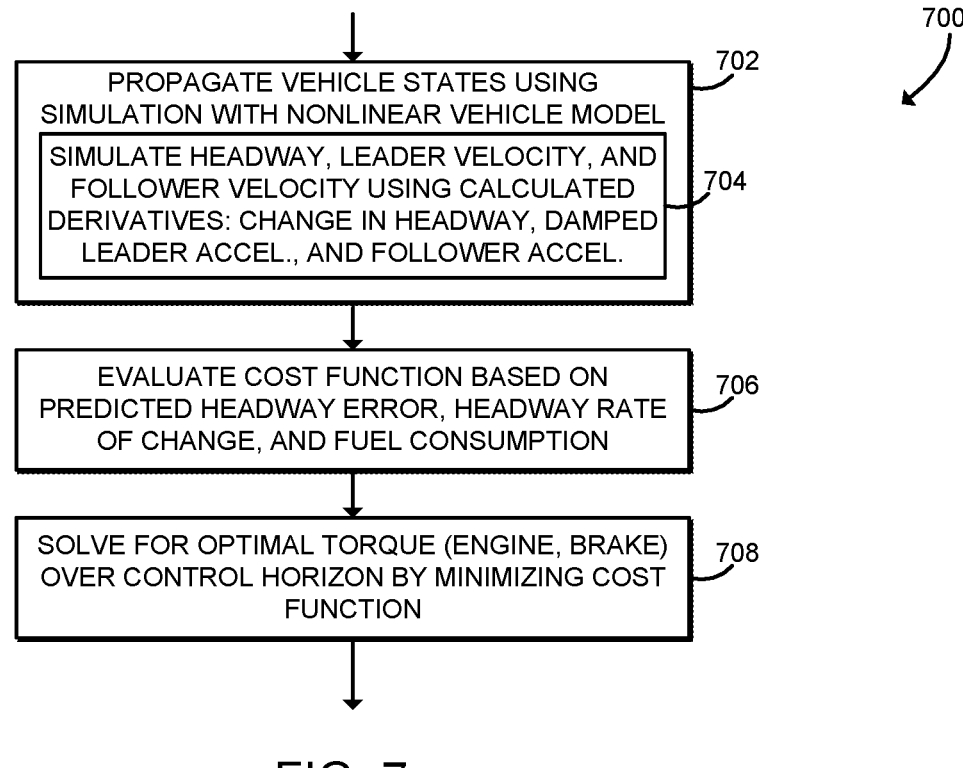
FIG. 7 is a simplified flow diagram of at least one embodiment of a method for nonlinear programming optimization that may be executed by a follower vehicle in connection with the method of FIG. 5.

Referring again to block 404, the method 400 as executed by each follower vehicle 406 proceeds to block 410, in which the follower vehicle 106 is controlled for optimized fuel consumption with variable headway 108 based on the grade profile. The computing device 120 of the follower vehicle 106 may, for example, control an input such as torque and/or velocity while using the grade profile to optimize fuel consumption. For example, based on knowledge of upcoming terrain, the computing device 120 may increase or decrease the headway 108 between the follower vehicle 106 and the preceding vehicle 102 (e.g., the leader vehicle 104 or another follower vehicle 106) in order to optimize fuel consumption. The computing device 120 may use any appropriate control techniques to optimize fuel consumption. In at least one embodiment, the computing device 120 uses nonlinear model predictive control (NMPC) to optimize fuel consumption. One potential embodiment of a method for NMPC control for the follower vehicle 106 is shown in FIGS. 5 and 7 and described further below. Additionally or alternatively, in other embodiments the computing device 120 may use other control techniques, such as linear model predictive control, string-stable control such as H-infinity optimal control, or other control system.

In block 412, the follower vehicle 106 may communicate vehicle state with other vehicles 102 of the system 100. The follower vehicle 106 may, for example, communicate data indicative of velocity, acceleration, or other vehicle state data with the leader vehicle 104 and/or with one or more other follower vehicles 106. After communicating vehicle state data, the method 400 loops back to block 410 to continue controlling the follower vehicle 104.

Referring now to FIG. 5, in use, each vehicle 102 of the system 100 may execute a method 500 for nonlinear model predictive control. It should be appreciated that, in some embodiments, the operations of the method 500 may be performed by one or more components of the environment 300 of the vehicle 102 as shown in FIG. 3. The method 500 begins with block 502, in which the computing device 120 of the vehicle 102 determines one or more parameters for a nonlinear model of the vehicle 102. The parameters may be determined empirically or analytically, and in some embodiments may be predetermined and stored or otherwise programmed into the computing device 120.

In block 504, the computing device 120 determines a longitudinal vehicle model for the vehicle 102. The longitudinal vehicle model may be embodied as one or more differential equations that describe and predict longitudinal motion of the vehicle 102, including dynamic acceleration and deceleration behavior. In some embodiments, the longitudinal vehicle model may be embodied as Equation 1, below. In Equation 1, X is vehicle longitudinal position, $\dot{X}$ is vehicle speed, and $\ddot{X}$ is vehicle acceleration. $M_{eff}$ is effective mass of the vehicle and trailer, and may be calculated according to Equation 2, below. $B_{eff}$ is an effective damping coefficient that may be calculated according to Equation 3, below, and D is a drag coefficient. $\tau_{eng}$ is engine torque, $\eta_{diff}$ is differential gear ratio (e.g., final drive), and $\eta_{trans}$ is transmission gear ratio. $F_{rr}$ is force due to rolling resistance, and $F_{grade}$ is force due to grade. Accordingly, $F_{grade}$ may be determined for any position X along the route 110 based on the grade profile determined as described above.

$$M_{eff}\ddot{X} + B_{eff}\dot{X} + D\dot{X}^2 = \frac{\tau_{eng} * \eta_{diff} * \eta_{trans}}{r_{eff}} - F_{rr} - F_{grade} \quad (1)$$

$$M_{eff} = (M_{tractor} + M_{trailer}) + \frac{J_{diff}}{R_w^2} + \frac{J_{eng}\eta_{diff}^2\eta_{trans}^2}{R_w^2} \quad (2)$$

$$B_{eff} = \frac{B_{diff} + B_{trans} * \eta_{diff}^2 + B_{eng} * \eta_{diff}^2 * \eta_{trans}^2}{R_w^2} \quad (3)$$

In some embodiments, in block 506 the computing device 102 may determine a headway model. For example, each follower device 106 may determine a headway model. The headway model may be embodied as one or more differential equations that describe and predict the headway 108 between the vehicle 102 and the preceding vehicle in the system 100, such as the leader vehicle 104 or another follower vehicle 106. Similar to the longitudinal vehicle model, the headway model is also determined based on the grade profile for the route 110. In particular, in some embodiments the headway model may include calculating vehicle velocity and/or acceleration using the Equations 1-3 as described above.

After determining parameters for one or more models, the method 500 proceeds block 508, in which the computing device 120 determines velocity and torque trajectories using nonlinear model predictive control (NMPC) and an objective function. The velocity and torque trajectories define input to the system (e.g., the vehicle 102) over a control horizon (in time or distance), and may be embodied as a series of torque values and optimal velocity values. The torque values may be used, for example, to control the vehicle 102 using the low level by wire system 132. The vehicle 102 may, for example, activate the throttle and/or service brakes according to values of the torque trajectory. As part of NMPC, the computing device 120 simulates behavior of the vehicle 120 into the future using the nonlinear model of the vehicle described above. The computing device 120 uses an optimizer (e.g., a nonlinear programming (NLP) optimizer) to find the optimal velocity and torque trajectories based on the objective function. As described further below in connection with FIGS. 6 and 7, the objective function includes fuel consumption as a weighted term. The particular objective function used may vary between the leader vehicle 104 and the follower vehicles 106. For example, as shown in FIG. 6 and described further below, the objective function for the leader vehicle 104 may be based on fuel consumption and speed error. As another example, as shown in FIG. 7 and described further below, the objective function for each follower vehicle 106 may be based on fuel consumption, headway error, and headway rate of change error.

In the illustrative embodiment, the computing device 120 may execute a nested control structure in order to improve performance. In block 510, in an outer loop, the computing device 120 generates a feedforward torque profile and optimal velocity profile with the NLP optimizer. As described above, the computing device 120 may simulate behavior of the vehicle 102 and optimize for fuel consumption. In block 512, in an inner loop, the computing device 120 generates torque compensation based on a measured velocity error from the optimal velocity profile. The torque compensation may be embodied as a corrective torque value generated by a PID controller or other controller based on the velocity error. In block 514, the computing device 120 controls the vehicle 102 based on the feedforward torque combined with the torque compensation. The computing device 120 may, for example, dispatch one or more torque commands to the low-level by wire system 132 via the CAN bus 128. In block 516, the computing device 120 may communicate one or more vehicle states with other vehicles 102. As described above, the computing device 120 may send and/or receive vehicle state data including vehicle speed and acceleration with the other devices 102. In block 518, the computing device 120 monitors velocity in the inner loop. The computing device 120 may calculate velocity error compared to the optimal velocity profile and then feed that velocity error back to the inner loop controller as described in block 512. In block 520, the computing device 120 monitors torque, grade, braking, and velocity in the outer loop. The computing device 120 may calculate error and/or otherwise feed that data back to the NMPC controller as described in block 510. Using the nested feedback loop arrangement shown in FIG. 5, the computing device 120 may reliably achieve output rates necessary for real time control. For example, in an embodiment the computing device 120 may achieve a 20 Hz control rate. Of course, in other embodiments a different control arrangement may be used. For example, some embodiments may including a single NMPC control loop.

Referring now to FIG. 6, in use, a leader vehicle 104 of the system 100 may execute a method 600 for nonlinear programming optimization. It should be appreciated that, in some embodiments, the operations of the method 600 may be performed by one or more components of the environment 300 of the vehicle 102 as shown in FIG. 3. Additionally or alternatively, in some embodiments the method 600 may be executed in an outer control loop as described above in connection with block 510 of FIG. 5. The method 600 begins with block 602, in which the computing device 120 of the leader vehicle 104 propagates vehicle states in the grade profile using simulation with the nonlinear longitudinal vehicle model described above. Illustratively, two vehicle states $x_1$, $x_2$ are defined as vehicle position and vehicle velocity, respectively. In block 604, the computing device 120 simulates values for vehicle position and vehicle velocity using derivatives of those states. In particular, the derivative $\dot{x}_1$ is the velocity $x_2$, also denoted $v_x$. The derivative $$\dot{x}_2 = \ddot{x}_1 = a_x,$$

which is the acceleration of the vehicle. This acceleration $a_x$ may be calculated using the longitudinal vehicle model described above in connection with Equations 1 through 3. The computing device 120 may propagate states forward using the Runge-Kutta 4th order method or any other appropriate technique.

In block 606, the computing device 120 of the leader vehicle 104 evaluates a cost function associated with the propagated vehicle states. The leader vehicle 104 cost function is based on velocity error compared to a target velocity (e.g., 55 miles per hour, 25 meters per second, or other setpoint) and fuel consumed. An illustrative cost function $J_{eco-cruise}$ is shown in Equation 4, below. In the illustrative cost function, $Q_1$ and $Q_2$ are tunable weights to yield desired performance. If $Q_2$ is zero, then the computing device 120 will aggressively track the desired set speed. When $Q_2$ is increased, the computing device 120 allows the speed of the vehicle 102 to fluctuate over hills, which may save fuel. As an example, the computing device 120 may allow the vehicle 102 to coast over the desired set speed while going down a hill so that the vehicle 102 carries more kinetic energy into the next hill, which may require less fuel to power back to speed.

$$J_{eco-cruise} = Q_1 \sum Err_{vel}^2 + Q_2 \sum \text{fuel}_{consumed}^2 \qquad (4)$$

The cost function shown in Equation 10 is in terms of fuel consumed. The value of fuel consumed may be determined based on the longitudinal model described above in connection with Equations 1-3. In particular, Equation 1 may be used to determine vehicle speed, which is related to wheel speed. Wheel speed $\omega_{wheel}$ may be converted to engine speed $\omega_{eng}$ based on differential and transmission gear ratios as well as wheel radius, as shown in Equation 5, below. Engine speed may be converted to engine torque using a torque curve associated with the engine of the vehicle 102. Each engine may have a particular torque curve, which may be supplied by the engine manufacturer, measured, or otherwise determined. In the illustrative embodiment, the torque curve of the engine is modeled as a third-order polynomial that is fit to a published torque curve for the engine of the vehicle 102, as shown in Equation 6. Next, engine torque is converted to fuel consumption. Illustratively, engine torque may be converted to fuel consumption using brake-specific-fuel-consumption (BSFC), which is a functional relationship from engine power and engine speed to fuel rate. Each engine may have an associated BSFC map, which may be provided by an engine manufacturer or may be determined experimentally. For example, data may be collected for engine power, engine speed, and fuel rate and a model may be created using least-squares fitting. The computing device 120 may use a linear model as shown in Equation 7 or a non-linear model as shown in Equation 8.

$$\omega_{eng} = \frac{\pi}{30} \frac{\eta_{diff} * \eta_{trans}}{R_w} * \omega_{wheel} \qquad (5)$$

$$\tau_{eng} = c_1\omega^3 + c_2\omega^2 + c_3\omega + c_4 \qquad (6)$$

$$\dot{m}_{fuel} = Pow_{eng} * b_0 \qquad (7)$$

$$\dot{m}_{fuel} = Pow_{eng}^2 * \omega_{eng} * b_0 + Pow_{eng} * \omega_{eng} * b_1 + Pow_{eng} * b_2 \qquad (8)$$

In block 608, the computing device 120 solves for optimal torque (including engine torque and/or service brake application) over the control horizon by minimizing the cost function. To minimize the cost function, the computing device 120 may use any appropriate nonlinear programming optimizer or other optimization technique. For example, in the illustrative embodiment the computing device 120 performs a direct multiple shooting operation to solve for an optimal control horizon. After optimizing a torque trajectory over the control horizon, the computing device 120 may continue to control the vehicle 102 and, accordingly, repeatedly execute the method 600. For example, the computing device 120 may use the torque trajectory to perform inner-loop control operations as described above in connection with FIG. 5, and the computing device 120 may execute the method 600 repeatedly during each execution of the outer control loop as described above.

Referring now to FIG. 7, in use, a follower vehicle 106 of the system 100 may execute a method 700 for nonlinear programming optimization. It should be appreciated that, in some embodiments, the operations of the method 700 may be performed by one or more components of the environment 300 of the vehicle 102 as shown in FIG. 3. Additionally or alternatively, in some embodiments the method 700 may be executed in an outer control loop as described above in connection with block 510 of FIG. 5. The method 700 begins with block 702, in which the computing device 120 of the follower vehicle 106 propagates vehicle states in the grade profile using simulation with the nonlinear headway model described above. Illustratively, the headway model may define three states $x_1$, $x_2$, $x_3$, as shown in Equations 9 through 11, below. In particular, state $x_1$ is the headway 108, state $x_2$ is the speed of the preceding vehicle 102 (labeled vehicle i+1 and, e.g., the leader vehicle 104 or preceding follower vehicle 106), and state $x_3$ is the velocity $v_{x(i)}$ of the current vehicle 102. In block 704, the computing device 120 simulates values for headway, preceding vehicle velocity, and current vehicle velocity using derivatives of those states, which are shown in Equations 12 through 14 below. The derivative $\dot{x}_1$ is the change in headway and is equal to the difference between the preceding vehicle speed $x_2$ and the current vehicle speed $x_3$. Derivative $\dot{x}_2$ is the damped acceleration of the preceding vehicle 102. As shown, a first order decay is applied to the preceding vehicle acceleration, and the velocity profile of the preceding vehicle is generated using a decaying acceleration model. This may improve string stability for following vehicles 106. State data for other vehicles (e.g., the preceding vehicle) may be shared using vehicle to vehicle communication or otherwise communicated between vehicles. Derivative $\dot{x}_3$ is the acceleration of the current vehicle 102, which may be determined using the longitudinal vehicle model described above in connection with block 504 and Equations 1 through 3, above. As described above, the computing device 120 may propagate states forward using the Runge-Kutta 4th order method or any other appropriate technique. Accordingly, calculation of the headway model also incorporates the grade profile.

$$x_1 = x_{headway} \tag{9}$$

$$x_2 = v_{x(i+1)} \tag{10}$$

$$x_3 = v_{x(i)} \tag{11}$$

$$\dot{x}_1 = x_2 - x_3 = v_{x(i+1)} - v_{x(i)} \tag{12}$$

$$\dot{x}_2 = e^{-2t} * a_{x(i+1)} \tag{13}$$

$$\dot{x}_3 = a_{x(i+1)} \tag{14}$$

In block 706, the computing device 120 of the follower vehicle 106 evaluates a cost function associated with the propagated vehicle states. The follower vehicle 106 cost function is based on headway error compared to a target headway (e.g., 1.4 seconds, 1 second, 0.8 seconds, or other following distance or following time), headway rate error, and fuel consumed. This cost function allows the following vehicle 106 to maintain a following distance such that the vehicle 102 obtains air-drag reduction while allowing enough variation in vehicle headway that the aerodynamic benefits are not overshadowed by saturation effects from the controller. Headway rate hdwy may be included in the cost function to prevent the following vehicle from falling back and exiting the aero-benefit zone quickly, or from catching up too fast and needing to use the service brakes. An illustrative cost function $J_{optimal\ following}$ is shown in Equation 15, below. In the illustrative cost function, $Q_1$, $Q_2$, $Q_2$ are tunable weights to yield desired performance. As described above, fuel consumed may be determined based on the combined headway model and longitudinal vehicle model shown in Equations 1-3, 5-8, and 14.

$$J_{optimal\ following} = Q_1 \sum Err_{headway}^2 + Q_2 \sum hdwy^2 + Q_3 \sum fuel_{consumed}^2 \tag{15}$$

In block 708, the computing device 120 solves for optimal torque (including engine torque and/or service brake application) over the control horizon by minimizing the cost function. As described above, to minimize the cost function, the computing device 120 may use any appropriate nonlinear programming optimizer or other optimization technique. For example, in the illustrative embodiment the computing device 120 performs a direct multiple shooting operation to solve for an optimal control horizon. After optimizing a torque trajectory over the control horizon, the computing device 120 may continue to control the vehicle 102 and, accordingly, repeatedly execute the method 700. For example, the computing device 120 may use the torque trajectory to perform inner-loop control operations as described above in connection with FIG. 5, and the computing device 120 may execute the method 700 repeatedly during each execution of the outer control loop as described above.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A method for platooned vehicle control, the method comprising:

controlling, by a first computing device of a leader vehicle, velocity of the leader vehicle within a predetermined route based on a grade profile of the predetermined route; and controlling, by a second computing device of a follower vehicle, velocity of the follower vehicle within the predetermined route based on a headway distance between the follower vehicle and the leader vehicle and the grade profile of the predetermined route;

wherein controlling the velocity of the following vehicle comprises determining a system input over a control horizon using nonlinear model predictive control with a cost function, wherein the system input comprises a torque trajectory and a velocity trajectory, and wherein the cost function is evaluated based on predicted headway error, predicted headway rate of change, and predicted fuel consumption; and wherein evaluating the cost function comprises:

determining wheel speed of the follower vehicle using a nonlinear longitudinal vehicle model;

determining engine speed based on the wheel speed;

determining engine torque based on the engine speed and a torque curve associated with the follower vehicle; and determining the predicted fuel consumption based on the engine torque and the engine speed.

2. The method of claim 1, further comprising:

communicating, by the first computing device, vehicle state data for the leader vehicle to the follower vehicle;

wherein controlling the velocity of the follower vehicle further comprises controlling the velocity of the follower vehicle based on the vehicle state data for the leader vehicle.

3. The method of claim 1, wherein determining the system input comprising the torque trajectory and the velocity trajectory further comprises:

simulating headway, leader velocity, and follower velocity using a nonlinear longitudinal vehicle model with the grade profile of the predetermined route;

evaluating the cost function based on simulating the headway, the leader velocity, and the follower velocity; and determining the torque trajectory and the velocity trajectory by minimizing the cost function.

4. The method of claim 3, wherein simulating the headway, the leader velocity, and the follower velocity further comprises calculating a derivative of the headway comprising a change in headway, calculating a derivative of the leader velocity comprising a damped leader acceleration, and calculating a derivative of the follower velocity comprising a follower acceleration.

5. The method of claim 4, wherein:

simulating the headway, the leader velocity, and the follower velocity further comprises receiving leader velocity data from the leader vehicle via a vehicle-to-vehicle communication link; and calculating the derivative of the headway comprising the change in headway comprises calculating a difference between the leader velocity data and follower velocity data.

6. The method of claim 4, wherein:

simulating the headway, the leader velocity, and the follower velocity further comprises receiving leader acceleration data from the leader vehicle via a vehicle-to-vehicle communication link; and calculating the derivative of the leader velocity comprising the damped leader acceleration comprises applying a first order decay to the acceleration data.

7. The method of claim 1, wherein controlling the velocity of the leader vehicle comprises determining a second system input over a second control horizon using a second nonlinear model predictive control with a second cost function, wherein the second system input comprises a second torque trajectory and a second velocity trajectory, and wherein the second cost function is evaluated based on predicted velocity error and a second predicted fuel consumption.

8. A system for platooned vehicle control, the system comprising:

a first computing device coupled to a leader vehicle, the first computing device comprising a lookahead cruise controller to control velocity of the leader vehicle within a predetermined route based on a grade profile of the predetermined route; and a second computing device coupled to a follower vehicle, the second computing device comprising a headway controller to control velocity of the follower vehicle within the predetermined route based on a headway distance between the follower vehicle and the leader vehicle and the grade profile of the predetermined route;

wherein to control the velocity of the following vehicle comprises to determine a system input over a control horizon using a nonlinear model predictive control with a cost function, wherein the system input comprises a torque trajectory and a velocity trajectory, and wherein the cost function is evaluated based on predicted headway error, predicted headway rate of change, and predicted fuel consumption; and wherein to evaluate the cost function comprises to:

determine wheel speed of the follower vehicle with a nonlinear longitudinal vehicle model;

determine engine speed based on the wheel speed;

determine engine torque based on the engine speed and a torque curve associated with the follower vehicle; and determine the predicted fuel consumption based on the engine torque and the engine speed.

9. The system of claim 8, wherein:

the lookahead cruise controller of the leader vehicle is further to communicate vehicle state data for the leader vehicle to the follower vehicle; and to control the velocity of the follower vehicle further comprises to control the velocity of the follower vehicle based on the vehicle state data for the leader vehicle.

10. The system of claim 8, wherein to determine the system input comprising the torque trajectory and the velocity trajectory further comprises to:

simulate headway, leader velocity, and follower velocity with a nonlinear longitudinal vehicle model with the grade profile of the predetermined route;

evaluate the cost function based on simulating the headway, the leader velocity, and the follower velocity; and determine the torque trajectory and the velocity trajectory by minimization of the cost function.

11. The system of claim 8, wherein to control the velocity of the leader vehicle comprises to determine a second system input over a second control horizon using a second nonlinear model predictive control with a second cost function, wherein the second system input comprises a second torque trajectory and a second velocity trajectory, and wherein the second cost function is evaluated based on predicted velocity error and a second predicted fuel consumption.

12. A computing device for platooned vehicle control, the computing device comprising:

a lookahead headway controller to control velocity of a follower vehicle within a predetermined route based on a headway distance between the follower vehicle and a leader vehicle and a grade profile of the predetermined route; and a nonlinear model predictive controller to determine a system input over a control horizon for the lookahead headway controller using a cost function, wherein the system input comprises a torque trajectory and a velocity trajectory, and wherein the cost function is evaluated based on predicted headway error, predicted headway rate of change, and predicted fuel consumption;

wherein to evaluate the cost function comprises to:

determine wheel speed of the follower vehicle with a nonlinear longitudinal vehicle model;

determine engine speed based on the wheel speed;

determine engine torque based on the engine speed and a torque curve associated with the follower vehicle; and determine the predicted fuel consumption based on the engine torque and the engine speed.

13. The computing device of claim 12, wherein:

the headway controller is further to receive vehicle state data for the leader vehicle from the leader vehicle; and to control the velocity of the follower vehicle further comprises to control the velocity of the follower vehicle based on the vehicle state data for the leader vehicle.

14. The computing device of claim 12, wherein to determine the system input comprising the torque trajectory and the velocity trajectory further comprises to:

simulate headway, leader velocity, and follower velocity with a nonlinear longitudinal vehicle model with the grade profile of the predetermined route;

evaluate the cost function based on simulating the headway, the leader velocity, and the follower velocity; and determine the torque trajectory and the velocity trajectory by minimization of the cost function.

15. The computing device of claim 14, wherein to simulate the headway, the leader velocity, and the follower velocity further comprises to calculate a derivative of the headway comprising a change in headway, to calculate a derivative of the leader velocity comprising a damped leader acceleration, and to calculate a derivative of the follower velocity comprising a follower acceleration.

* * * * *